United States Patent [19]

Odemark

[11] Patent Number: 5,450,236
[45] Date of Patent: Sep. 12, 1995

[54] REFLECTOR, ESPECIALLY FOR DISPLAY SIGNS AND ROAD SIGNS AND A SIGN MANUFACTURED THEREOF

[75] Inventor: Björn Odemark, Stockholm, Sweden

[73] Assignee: Storra Aktiebolag, Upsala, Sweden

[21] Appl. No.: 930,390

[22] PCT Filed: Feb. 4, 1991

[86] PCT No.: PCT/SE91/00078

§ 371 Date: Sep. 8, 1992

§ 102(e) Date: Sep. 8, 1992

[87] PCT Pub. No.: WO91/12542

PCT Pub. Date: Aug. 22, 1991

[30] Foreign Application Priority Data

Feb. 7, 1990 [SE] Sweden ................................. 9000429

[51] Int. Cl.⁶ .................................................. G02B 5/136
[52] U.S. Cl. ..................................... 359/547; 359/515; 40/582; 404/14
[58] Field of Search ............... 359/546–552, 359/529–532, 515, 527; 404/14, 22; 40/903, 208, 582, 583; 116/63 R, 63 P, 63 C, 63 T

[56] References Cited

U.S. PATENT DOCUMENTS

| | | |
|---|---|---|
| 1,298,840 | 4/1919 | Wertz et al. |
| 1,782,721 | 11/1930 | Frenkel |
| 1,858,975 | 5/1932 | Ta'Bois |
| 1,987,357 | 1/1932 | Bergen et al. .......... 359/546 |
| 2,017,617 | 10/1935 | Di Guistin ............. 30/130 |
| 2,132,649 | 10/1938 | Sacksteder ............ 40/130 |
| 2,310,790 | 2/1943 | Jungersen ............ 88/105 |
| 2,421,277 | 5/1947 | Luce ...................... 88/82 |
| 4,252,409 | 2/1981 | Schwab ................ 404/14 |
| 4,712,868 | 12/1987 | Tung et al. ............ 359/531 |

FOREIGN PATENT DOCUMENTS

| | | |
|---|---|---|
| 0269329 | 6/1988 | European Pat. Off. |
| 037730 | 1/1931 | France ................. 359/546 |
| 2416487 | 8/1979 | France |
| 2301868 | 2/1980 | Germany |
| 65708 | 8/1924 | Sweden |
| 438215 | 4/1985 | Sweden |
| 0330080 | 6/1930 | United Kingdom ..... 359/546 |

*Primary Examiner*—Loha Ben
*Assistant Examiner*—James Phan
*Attorney, Agent, or Firm*—Luedeka, Neely & Graham

[57] ABSTRACT

A reflecting material, especially for display signs and road signs, is in the form of a plate (20) which is made of a transparent material and has a front surface (21) and, substantially parallel thereto, a reflecting rear surface (22). The rear surface has juxtaposed reflectors (23) with a reflecting surface coating (24). The reflectors are concave, as seen from the front surface of the plate, and so designed that light rays having an angle of incidence of about 7°–65° are reflected at an angle of reflection of about 0° to the normal of the front surface of the plate.

15 Claims, 2 Drawing Sheets

REFLECTOR, ESPECIALLY FOR DISPLAY SIGNS AND ROAD SIGNS AND A SIGN MANUFACTURED THEREOF

This invention relates to a reflector which in particular is intended for use as a material for road signs and other display signs, as well as to a display sign, especially a road sign, manufactured of such a reflector.

BACKGROUND OF THE INVENTION

Practically all road signs are normally provided with a so-called retroreflective material (thin adhesive tape). Such materials increase the visibility and detectability of the road signs, provided that light from the car headlights actually impinges upon the sign. In the countryside, this is almost always the case. In cities, however, it is common that the light beams from the car headlights do not reach the road signs, since a great many road signs are placed on overhead frame structures bridging the roadway, or so high up that they are outside the light/darkness border of dipped headlights. Since signs in cities have to be well lit up, separate light fittings are often mounted on or above the road signs.

U.S. Pat. No. 2,017,617 discloses how to direct light from ordinary street lights to a sign, in this case a street sign, by means of an adjustable flat mirror. The sign is of conventional construction and has no special reflecting power.

U.S. Pat. No. 1,858,975 discloses an advertising sign which is made of a transparent material and, at its back, has reflecting surfaces so directed that they reflect light at an angle which, to people within a given area in front of the sign, makes the advertising sign look as if lit up. Planar as well as curved mirrors are disclosed.

SE-B-65,708, U.S. Pat. Nos. 2,310,790, 1,298,840 and DE-A-2,301,868 disclose reflectors of a type reflecting light approximately in the direction of the light source. The rear surface of the reflector is prismatically designed, and has angularly disposed reflecting surfaces which, in some cases, are completely planar and, in other cases, are conical or spherical.

SE-B-438,215 and corresponding U.S. Pat. No. 4,252,409 disclose a reflector for game, which is in the form of a transparent plate in which the surface opposite to the light-admitting surface is made up of toroidal surfaces which are juxtaposed and support a reflecting layer. The optical axes of the toroidal surfaces are arranged at an angle to the normal of the light-admitting surface. When mounted, the reflectors are positioned at such an angle to the verge of the road, and thus to the beams from vehicle headlights, that the beams are reflected to the surroundings, thereby scaring off the animals.

U.S. Pat. No. 2,132,649 discloses a display sign having a curved reflecting surface behind opaque letters or characters so that these are illuminated from the back, giving the impression of a background surface illuminated from behind.

U.S. Pat. No. 1,782,721 discloses an advertising sign having internal reflecting surfaces for deflecting light arriving obliquely from above, in such a manner that the light will be construed as an internal source of illumination in the advertising sign.

In spite of the existing prior art, there is, however, a need for a reflecting material and reflecting signs, especially road signs, of a reflecting power which enables efficient use of the street light in order to make visible the information at issue.

One object of the invention is, therefore, to provide a reflecting material of suitable reflecting power. Another object is to provide a suitable reflecting material for display signs, especially road signs, which when mounted reflects light from ordinary street lights in such a direction that an observer of the sign perceives it in a manner similar to the reflections from a retroreflecting material illuminated by car headlights, but being stronger than such reflections. At the sign, the strength of the light from street lamps is much greater, often up to 100 times, than that of the light from car headlights impinging upon the sign.

SUMMARY OF THE INVENTION

Briefly, the invention is based on the idea of providing the reflecting material with small, juxtaposed reflectors which are so designed that light arriving at the reflectors within a given range of angles of incidence will be reflected by the reflecting material towards an onlooker or observer standing approximately on a level with the sign or within a given angular area below.

The distinctive features of the reflecting material and the sign according to the invention are a reflecting transparent plate material having a flat front surface and a plurality of juxtaposed, concave, reflection cells as seen from the front surface. The concavity of these cells is formed into two parabolic surfaces, a primary surface having a focal point about 10 m from the plate and a secondary surface having a focal point about 50 m from the plate whereby light incidents upon the cells from the angular arc of about 6° to 65° from the normal of the front surface will be reflected at a substantially 0° angle to the front surface normal.

DESCRIPTION OF THE DRAWINGS

The invention will be described in more detail below, reference being had to the accompanying drawings illustrating the invention. In the drawings, FIG. 5 is a side view of the reflector in FIGS. 3 and 4, isodepth lines of the reflector being drawn in.

DETAILED DESCRIPTION OF THE INVENTION

Figure 1:
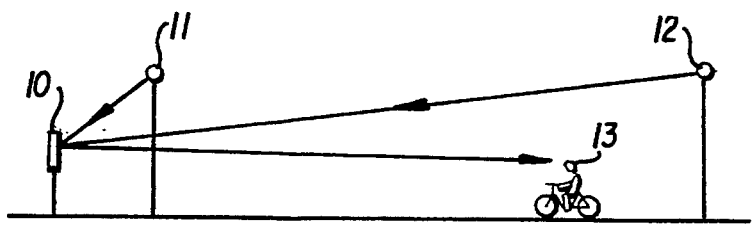
FIG. 1 is a basic outline of the placement and the illumination of a road sign according to the invention.
Figure 2:
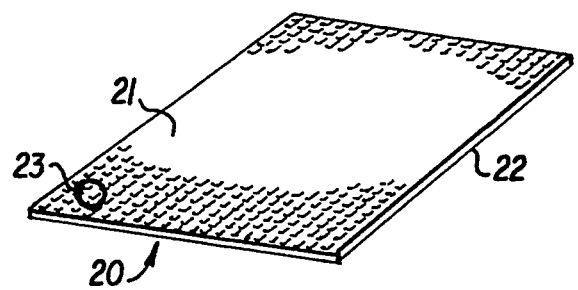
FIG. 2 is schematic perspective view illustrating a reflecting material according to the invention.
Figure 7:
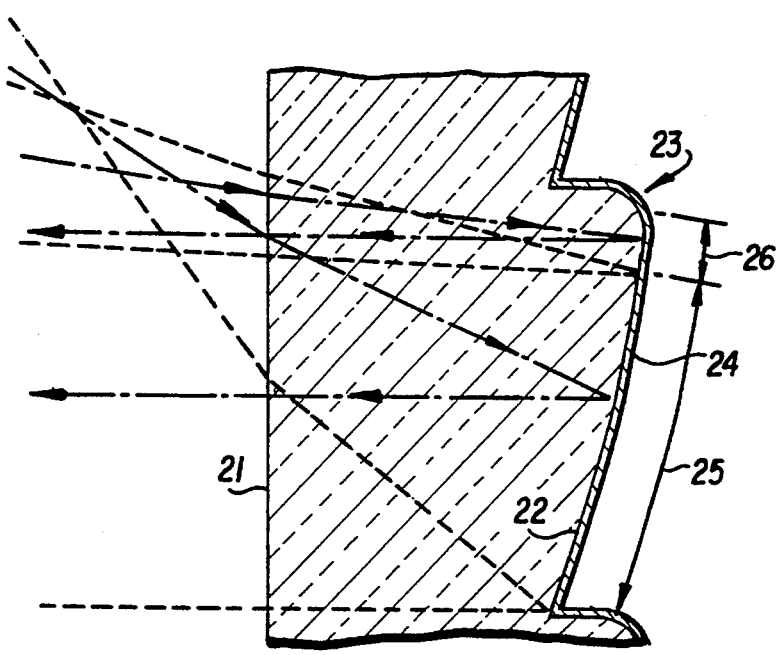
FIG. 7 shows a section corresponding to FIG. 3 and having drawn-in ray path lines.

FIG. 1 illustrates a road sign 10 which is positioned at a normal height above the ground. At a distance of 5–15 m, there is a post with a street-light fitting 11 at a normal distance above the ground. A further 40 m away, there is another post with a street-light fitting 12. There is a road-user, e.g. a cyclist 13, between the two posts. The inventive road sign 10 is made of the reflecting material according to the invention. This material has a plurality of juxtaposed reflectors which, as seen from the front surface of the road sign, are concave, and so designed that light rays having an angle of incidence within an angular area α of about 6°–65°, preferably an angular area β of 10°–65°, most preferably an angular area ε of about 20°–55°, are reflected at an angle of reflection of about 0° to the normal of the front surface of the road sign. The preferred embodiment of the reflector cells of the reflecting material will be described below.

FIGS. 2-7 illustrate a preferred embodiment of the reflecting material according to the invention. The material may be in the form of a plate 20 having a front surface 21 and a rear surface 22. According to the invention, the plate is made of a transparent material, such as glass and plastic, the latter being preferred. The plate may be laminated with a support material which, in some cases, is required to impart the necessary mechanical strength to the inventive material. Thus, the plate may be laminated with a strong plate, reinforced or not, of plastic or a suitable metal. If so, the rear surface 22 is connected to the support material, e.g. by gluing. The rear surface 22 of the plate may also be coated with a pressure-sensitive adhesive covered with a release paper, so that the plate can readily be applied to an optional support.

Figure 3:
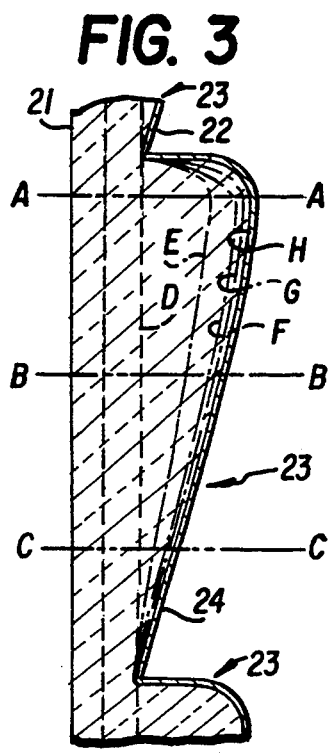
FIG. 3 shows a vertical longitudinal section, taken along line H—H in FIGS. 4 and 5, of a reflecting material according to the invention.

As is apparent from FIG. 3, the plate has rearwardly projecting reflectors 23 which are juxtaposed, thus forming a checked pattern on the rear surface 22 of the plate. Further, the rear surface of the plate is coated with a reflecting layer 24, preferably a metal layer. The plastic or glass plate 20 may have a total thickness of about 2 mm, and the reflectors 23 may project about 0.7 mm from the plate. Owing to the reflecting layer 24, each reflector cell 23 will form a curved mirror which, as seen from the front of the plate, is concave, and so designed and forms such an angle with the front surface of the plate that light rays coming obliquely from above and having an angle of incidence in a range α of about 6°–65° to the front surface of the plate, will be reflected at an angle of reflection of about 0° to the normal of the front surface of the plate, i.e. roughly along the normal of the front surface and with a certain divergence in small angles thereabout.

In the preferred embodiment shown, the reflectors or reflector cells 23 are approximately quadrilateral, one side being 3 mm. The curved reflecting surface 24 has an primary arcuate field 25 and, connecting thereon, a secondary arcuate field 26.

The primary field 25 is preferably integrally formed with a substantially parabolic reflector surface whose focal point is situated at a distance of about 10 m from the plate 20, along a line which forms an angle of about 35° with the normal of the front surface 21 of the plate. Owing to this design, light rays from a light source located approximately at the focal point will be reflected from the reflecting device roughly along the normal of the front surface 21 of the plate.

The secondary field 26 is preferably formed integrally with a substantially parabolic reflector surface, whose focal point is situated at a distance of about 50 m from the plate 20, along a line which forms an angle of about 7° with the normal of the front surface 21 of the plate. Owing to this design, light rays from a light source located approximately at the focal point will be reflected from the reflecting device roughly along the normal of the front surface 21 of the plate.

It may be difficult to form exactly parabolic surfaces, and the invention therefore embraces a parabolalike design. Within the scope of the invention, it is thus possible to design the primary field as an arcuate surface whose chord, which lies in a vertical plane, is inclined about 75° to the normal of the front surface of the plate. Similarly, the secondary field may be designed as an inclined, arcuate surface whose chord is inclined about 83° to the normal of the front surface of the plate.

Round the primary and secondary fields, the curved reflecting surface 24 may have a generally rounded shape up to the border against adjoining reflecting surfaces 24. This is apparent from section lines A—A, B—B and C—C in FIG. 4.

Figure 5:
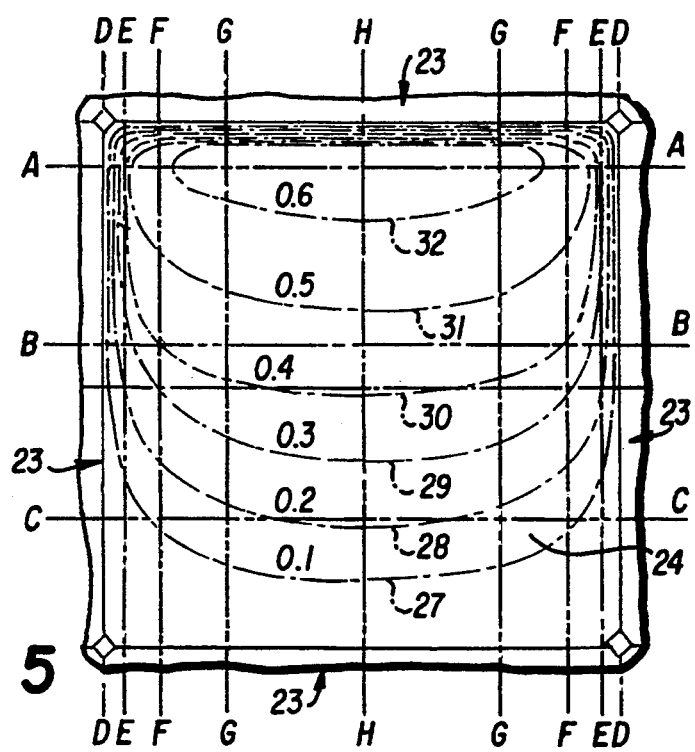

FIG. 5 is a side view of a reflecting surface 24, the isodepth lines 27-32 being drawn in for the depths 0.1, 0.2, 0.3, 0.4, 0.5 and 0.6 mm, the reflecting surface totally projecting 0.65 mm.

Figure 4:
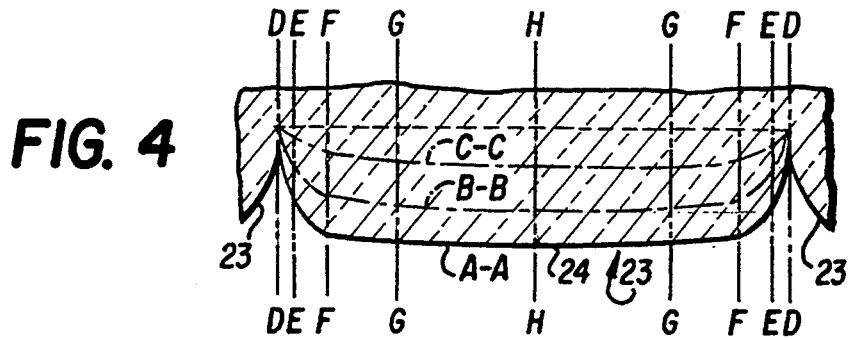
FIG. 4 shows sections taken along lines A—A, B—B and C—C in FIG. 3 and only illustrates the outwardly bulging reflector.

FIG. 3, which shows a section taken along line H—H in FIGS. 4 and 5, includes section lines for the sections D—D, E—E, F—F and G—G in FIGS. 4 and 5, thereby rendering apparent the shape of the reflector cells in the currently preferred embodiment of the invention.

Figure 6:
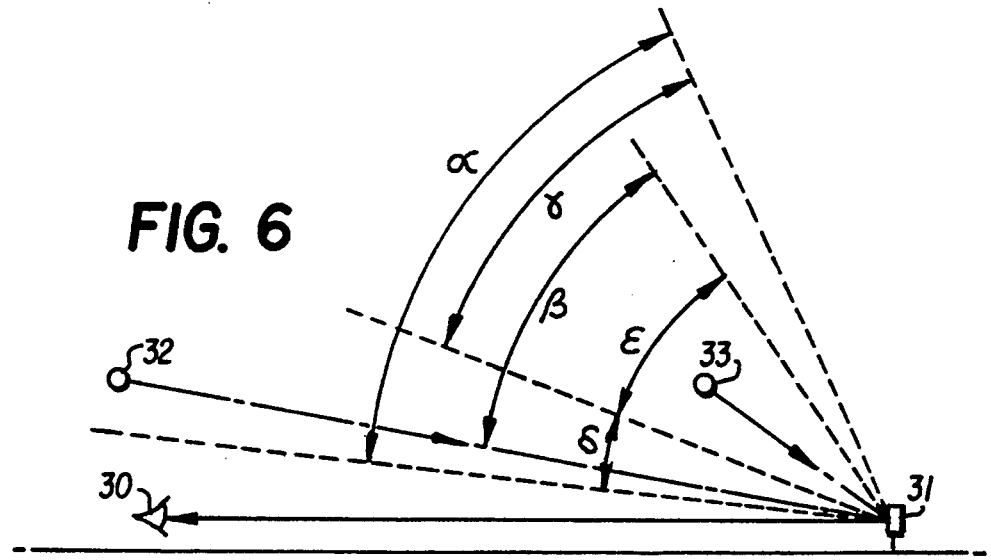
FIG. 6 is a key plan corresponding to FIG. 1.

FIG. 6 is a key plan illustrating the function of a road sign of the invention, in particular that of the preferred embodiment described above. A road-user or observer 30 travelling in a street with a road sign 31 is able to read/identify the road sign when travelling within a reading-range. A light fitting 32 is located about 50 m from the road sign, and another light fitting 32 is situated about 10 m from the road sign.

In the preferred, approximately parabolic embodiment comprising the primary and secondary reflecting fields 25 and 26, the primary, i.e. nearest light fitting, is to be positioned within an angular area γ of about 20°–65°, preferably within an angular area ε of about 20°–55°, to the normal of the front surface of the road sign. In this manner, the luminous flux reflected from the nearest street light 33 is maximised. The luminous flux is at its largest when the light is positioned centrally within the angular area.

The secondary street light 32, i.e. the one farthest away, is to be placed within an angular area δ of about 6°–20° to the normal of the front surface of the road sign. Owing to this position, also the secondary light will be efficiently used, even if the reflection in this case is substantially reduced because of the smaller area of the secondary field 26 of the reflecting surface. As before, the best luminous flux is obtained if the light is placed centrally within the angular area.

As mentioned, the reflecting surfaces 24 have been formed with varying radii of curvature, such that the largest radius (=the largest power of reflection) is obtained in the middle of the reflector cell. This means that the reflecting power always is at its largest when the road sign is so turned that a chord of the primary field, lying in a plane containing the light source, extends perpendicular to a bisector of the angle γ, preferably perpendicular to a bisector of the angle β, most preferably to a bisector of the angle ε. In corresponding manner, the largest reflecting power of the secondary field is obtained if the secondary light 32 is on a line perpendicular to a chord of the secondary field and forming a bisector of the angle δ.

The curved transitional areas according to sectional lines A—A, B—B and C—C will result in a certain lateral dispersion of the light, and it is thus not necessary to place the road sign on a straight line with the light posts.

Figure 8:
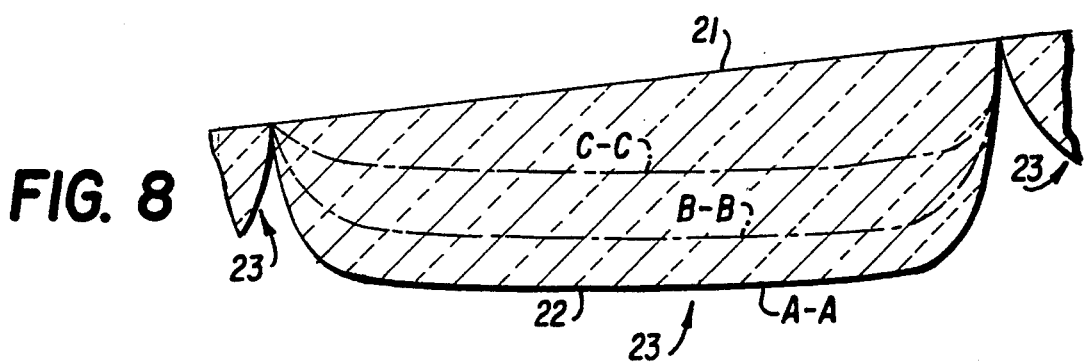
FIG. 8 shows a horizontal cross-section, taken along line A—A in FIG. 5, of an alternative embodiment of the reflecting material of the invention.

FIG. 8 illustrates another embodiment of the reflecting material according to the invention. The section shown corresponds to that of FIG. 4, and thus is perpendicular to that of FIG. 3. The only difference is that the front surface of the material, as seen in the section of FIG. 8, is inclined at an angle of about 6° compared with FIG. 4, such that the reflector cells are slightly deeper at one side than at the other.

In this arrangement, the reflector cells 23 are inclined relative to the front surface of the plate in two orthogonal planar sections, one of which is represented by the section of FIG. 8 and the other by the section of FIG. 3. As a result, light rays which in one planar section (FIG. 4) impinge at an angle of incidence of about 7°–65°, preferably about 10°–65°, most preferably about 20°–55°, will be reflected at an angle of reflection of about 0° to the normal in said first planar section of the front surface of the plate. At the same time, light rays which in the second planar section (FIG. 8) impinge at an angle of incidence of about 3°–10°, preferably 5°–7°, will be reflected at an angle of reflection of about 0° to the normal in said second planar section of the front surface of the plate. This double inclination of the reflector cells can be used if the street light is placed at a considerable lateral distance from the roadway carrying the traffic. Thus, the inclination laterally displaces the focal point of the approximately parabolic reflector cells, placing it roughly at the street light.

The embodiments described are but examples of a reflector and a sign according to the invention. Thus, variations are conceivable within the scope of the appended claims. The front or light-admitting surface 21 may thus be coated with a transparent or translucent material for forming the desired information, for example by pressing or gluing suitable layers of coating of optional colour and design. The reflecting layer 24 on the opposing surface may consist of an optional reflecting material, e.g. a layer of silver or another metal. The material used in the transparent plate 20 is preferably a transparent plastic material, e.g. acrylic plastic, or a glass material. For greater strength, a reinforced plastic plate, a metal sheet or another rigid plate-shaped material may be used as framework or strengthening layer behind the transparent plate.

I claim:

1. A reflecting material, especially for display signs and road signs, in the form of a plate (20) which is made of a transparent material and has a front surface (21) and, substantially parallel thereto, a reflecting rear surface (22) having juxtaposed reflectors (23) with a reflecting surface coating (24), wherein the reflectors (23) are substantially parabolic and concave, as seen from the front surface (21) of said plate (20), and provide with a primary field (25) and a secondary field (26) said primary field including a chord inclined about 75° to the normal of the front surface of said plate whereby light rays having an angle of incidence of about 7°–65° are reflected at an angle of reflection of about 0° to the normal of the front surface of said plate.

2. The material of claim 1 wherein the reflectors (23) are so designed that light rays having an angle of incidence of about 20°–55° are reflected at an angle of reflection of about 0° to the normal of the front surface of said plate.

3. The material of claim 1 wherein the primary field (25) forms a substantially parabolic reflector surface whose focal point is situated at a distance of about 10 m from the material, along a line which forms an angle of about 35° with the normal of the front surface (21) of said plate (20).

4. The material of claim 3 wherein the secondary field (26) connects with the primary field (25) at an end thereof situated farthest away from the front surface (21) of the plate (20) and which is so designed that light rays having an angle of incidence of about 5°–20° are reflected at an angle of reflection of about 0° to the normal of the front surface of said plate.

5. The material of claim 4 wherein a chord of the secondary field (26) is inclined about 83° to the normal of the front surface (21) of said plate (20).

6. The material of claim 5 wherein the secondary field (26) forms a substantially parabolic reflector surface whose focal point is situated at a distance of about 50 m from the material, along a line which forms an angle of about 10° with the normal of the front surface (21) of said plate (20).

7. The material of claim 1 wherein the reflectors (23) are of substantially quadrilateral design, and are rounded at opposing sides of the primary field (25).

8. The material of claim 7 wherein the reflectors (23) are inclined relative to the front surface of the plate in two orthogonal planar sections corresponding to said primary and secondary fields, and so designed that light rays arriving in the first planar section and having an angle of incidence of about 7°–65° are reflected at an angle of reflection of about 0° to the normal in said first planar section of the front surface of said plate, and that light rays arriving in the second planar section and having an angle of incidence of about 3°–10° are reflected at an angle of reflection of about 0° to the normal in said second planar section of the front surface of said plate.

9. The material of claim 8 formed as a coating on a road sign.

10. A display sign comprising a plate (20) which is made of a transparent material and has a front surface (21) and, substantially parallel thereto, a reflecting rear surface (22) having juxtaposed reflectors (23) with a reflecting surface coating (24), wherein the reflectors (23) are substantially parabolic and concave, as seen from the front surface (21) of said plate (20), and have a primary field (25) and a secondary field (26), said primary field (25) having an inclined, arcuate surface whose chord is inclined about 75° to the normal of the front surface (21) of said plate (20), and said secondary field (26) being connected with the primary field (25) at an end of the primary field situated farthest away from the front surface (21) of the plate (20) and being so designed that light rays having an angle of incidence of about 5°–20° are reflected at an angle of reflection of about 0° to the normal of the front surface of said plate.

11. The display sign of claim 10 wherein light rays having an angle of incidence against said primary field (25) of about 20°–55° are reflected at an angle of reflection of about 0° to the normal of the front surface of said plate.

12. The display sign of claim 10 wherein the primary field (25) forms a substantially parabolic reflector surface whose focal point is situated at a distance of about 10 m from the display sign, along a line which forms an angle of about 35° with the normal of the front surface (21) of said plate (20).

13. The display sign of claim 10 wherein a chord of the secondary field (26) is inclined about 83° to the normal of the front surface of said plate.

14. The display sign of claim 13 wherein the secondary field (26) forms a substantially parabolic reflector surface whose focal point is situated at a distance of about 50 m from the display sign, along a line which forms an angle of about 35° with the normal of the front surface (21) of said plate (20).

15. The display sign of claim 14 wherein the reflectors (23) are of substantially quadrilateral design, and are rounded at opposing sides of the primary field (25).

* * * * *

UNITED STATES PATENT AND TRADEMARK OFFICE
CERTIFICATE OF CORRECTION

PATENT NO. : 5,450,236
DATED : September 12, 1995
INVENTOR(S) : Björn Odemark

It is certified that error appears in the above-indentified patent and that said Letters Patent is hereby corrected as shown below:

In Claim 1, at Column 5, line 55, following "the front surface (21) of said plate (20), and" delete --provide-- and insert "provided".

Signed and Sealed this

Twentieth Day of February, 1996

BRUCE LEHMAN

Attest:

Attesting Officer

Commissioner of Patents and Trademarks